United States Patent Office 3,550,451
Patented Dec. 29, 1970

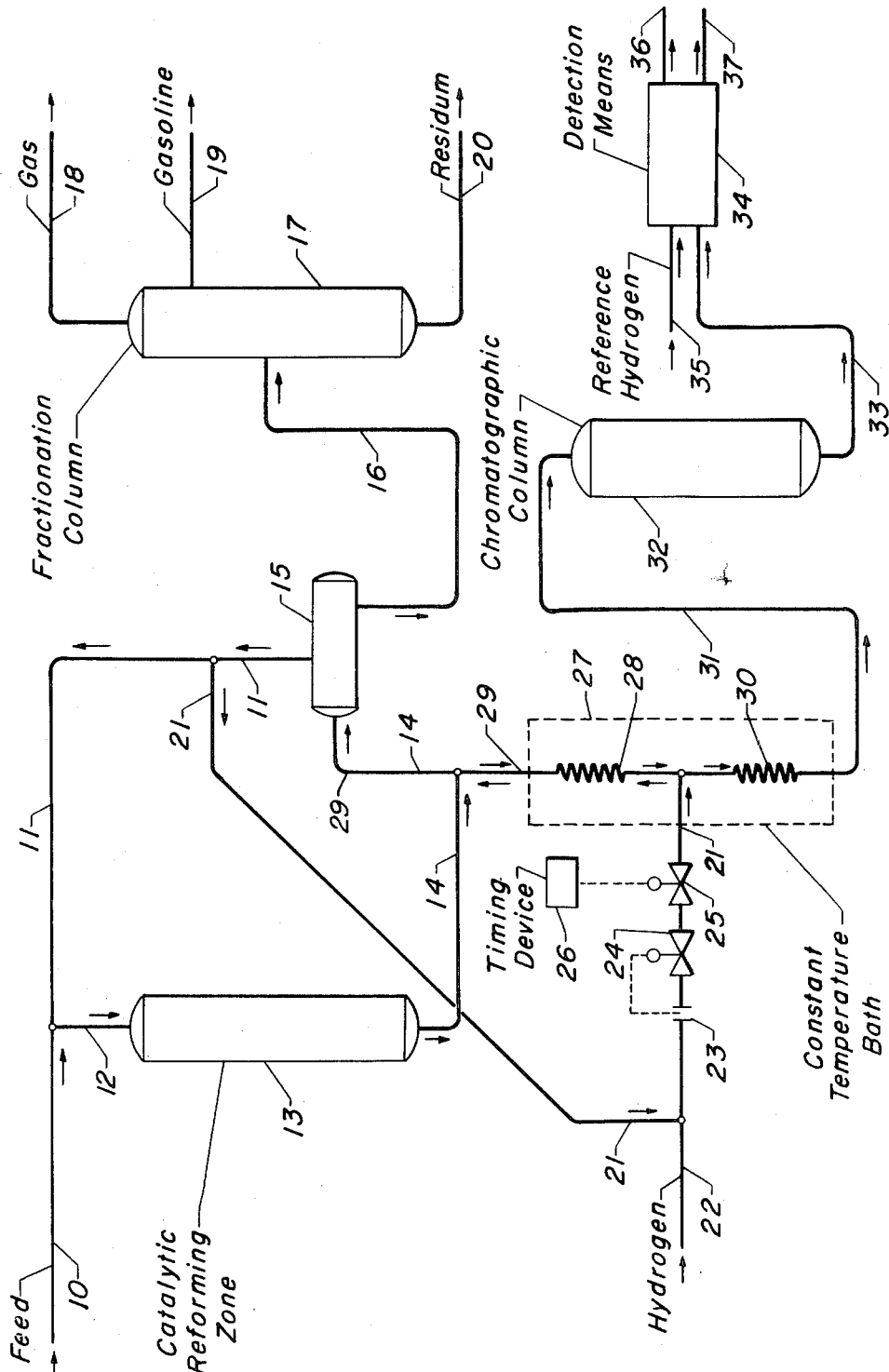

3,550,451
METHOD FOR OBTAINING SAMPLES AT HIGH TEMPERATURE AND HIGH PRESSURE
Ellsworth R. Fenske, Palatine, Ill., assignor to Universal Oil Products Company, Des Plaines, Ill., a corporation of Delaware
Filed Jan. 2, 1969, Ser. No. 788,562
Int. Cl. G01n 1/20
U.S. Cl. 73—422         4 Claims

ABSTRACT OF THE DISCLOSURE

Method for obtaining a representative sample of a high temperature, high pressure reaction zone effluent. An inert gas is passed through an inlet conduit into the flowing effluent stream, said inlet conduit being placed under a constant temperature environment. The flow of inert gas is stopped for a predetermined length of time thereby permitting a sample stream of the effluent to flow into the inlet conduit in a reverse direction to the previous flow of inert gas. The withdrawn sample is introduced into detection means and the flow of inert gas is reintroduced when the predetermined time has elapsed thereby stopping the sample flow without valve means in said inlet conduit.

BACKGROUND OF THE INVENTION

This invention relates to a method for withdrawing fluid samples from a process vessel or conduit containing process fluid. More particularly, the invention relates to a method for obtaining a representative sample of a high temperature, high pressure reaction zone effluent. More specifically, the invention relates to a method for sampling the hydrocarbon effluent from a catalytic reforming reaction zone.

In the chemical and petroleum industry there is an ever increasing need for better control of chemical processes as well as improved means for assuring the production of high quality products. As those skilled in the art are well aware, a chemical reaction is almost never selective enough to product only the desired product from the raw materials. In other words, in virtually every chemical reaction there is produced a variety of by-products which tend to contaminate the desired product thereby requiring extensive recovery facilities for segregating the desired product in high quality and high yield. Of course, one of the fundamental problems associated with the control of a chemical process is the time lag associated between a determination of quality and a change in a process variable responding to that determination of quality. For example, in catalytic reforming the desired gasoline boiling range product is frequently tested for octane number. Should the octane number be below the desired quality then an appropriate change is made on the reaction in order to improve the ultimate quality. However, the time lapse may vary from 30 minutes to several hours depending upon the size of the processing unit. The prior art techniques of sampling include, for example, obtaining an aliquot, cooling same, separating liquid and gaseous phases, analyzing the phases, and combining the analyses according to their relative amounts. Such problems, of course, are prone to errors.

Accordingly, it would be desirable if a means could be developed to sample the reaction zone effluent immediately after the reaction zone so that a prompt determination can be made as to the quality of the material being produced in the reaction zone.

SUMMARY OF THE INVENTION

Accordingly, it is an object of this invention to provide a method for obtaining a representative sample of a high temperature, high pressure reaction zone effluent.

It is another object of this invention to provide an improved method for the control of a hydrocarbon conversion process unit in a facile and economical manner.

It is a specific object of this invention to provide a method for sampling the total effluent from a catalytic reforming zone in a facile and economical manner.

It is another specific object of this invention to provide a method for sampling any high pressure and/or high temperature conduit containing a flowing fluid.

According to the practice of this invention, there is provided a sampling method for a representative sample of a reaction zone effluent which comprises: (a) introducing an inert gas through an inlet conduit into the flowing effluent stream, said inlet conduit being placed under a constant temperature environment external to the reaction zone; (b) stopping said introduction of inert gas for a predetermined length of time thereby permitting a sample stream of said effluent to flow into said inlet conduit in a reverse direction to said flow of inert gas; (c) withdrawing said sample from said inlet conduit; (d) passing said withdrawn sample into detection means; and (e) reintroducing said flow of inert gas when said time has elapsed thereby stopping the sample flow without valve means in said inlet conduit.

A particular embodiment of this invention includes the method hereinabove wherein said reaction zone effluent comprises the effluent from a hydrocarbon conversion reaction zone at a temperature from 600° F. to 1100° F., and pressure from 50 p.s.i.g. to 1200 p.s.i.g.

DETAILED DESCRIPTION OF THE INVENTION

The present invention is broadly applicable to sampling any high pressure conduit containing a flowing stream of fluid. The present invention is also applicable to any hydrocarbon conversion zone wherein it is desirable to obtain a sample of a process stream under usually high temperature, high pressure conditions. Examples of satisfactory reactions which produce effluents which can be sampled by the method of this invention include catalytic cracking, catalytic hydrocracking, hydrogenation, dehydrogenation, catalytic reforming, etc. As those skilled in the art are well aware, the conventional manner of obtaining any sample is through a wide variety of sampling apparatus, all of which involve the use of valve means which must be opened and closed in order to obtain a representative sample. As those skilled in the art are also aware, the valve means become a source of difficulty not only from a maintenance standpoint involving plugging, and the like, but also from a quality standpoint in that it is almost impossible to obtain a representative sample of a reaction zone effluent which has not completed its reaction. In other words, one of the problems associated with sampling a reaction is that the reaction itself may continue at the same or different rate than the flowing stream of material which was to be sampled. Accordingly, those skilled in the art have had to resort to sampling techniques involving correlation of variables or sampling techniques involving product sampling with relatively long time lapses between sample determination and the reaction which produced the particular sample, and the like.

It can be seen, therefore, from the embodiment of the above invention that the method of sampling does not utilize valve means so that the maintenance and plugging problems have been solved. It also utilizes a principle of maintaining the temperature of the sample at a level which corresponds to the environment of the flowing main stream of material sampled so that characteristics of the sample are now more closely related to the characteristics of the material sampled. In addition, the present invention obtains the sample as a single phase rather than as the liquid and vapor phase samples of the prior art.

For ease of explanation, the present invention will be described with reference to catalytic reforming, although, as previously mentioned, the invention is not necessarily to be limited thereto.

The art of catalytic reforming and the broad art of dehydrogenation of hydrocarbons is well known to those skilled in the art and need not be discussed in great detail herein. However, in brief, suitable charge stocks for use in the catalytic reforming operation to produce gasoline boiling range products, such as aromatic hydrocarbons, are those which contain both naphthenes and paraffins in relatively high concentrations. Such feedstock include narrow boiling range fractions, such as naphtha fractions, as well as substantially pure materials, such as cyclohexane and methylcyclohexane, and the like. The preferred class of suitable feedstocks for the catalytic reforming operation includes primarily straight-run gasolines, such as the light and heavy naphthas. It is distinctly preferred to use a naphtha fraction boiling between, say, 90° F. and 450° F. as the feedstock to the catalytic reforming operation.

The preferred types of catalyst for use in the catalytic reforming process are well known to those skilled in the art and, typically, comprise platinum on an alumina support. These catalysts may contain substantial amounts of platinum, but for economy and other reasons the platinum will typically be within the range from 0.05% to 5% by weight platinum.

Satisfactory operating conditions for the catalytic reforming operation include the presence of the hereinabovementioned catalysts and temperatures of about 600° F. to about 1100° F., preferably from 750° F. to 1000° F., pressures from about 50 p.s.i.g. to 1200 p.s.i.g., preferably from about 100 p.s.i.g. to 300 p.s.i.g., a weight hourly space velocity within the range from about 0.2 to 40 in the presence of a hydrogen-containing gas equivalent to a hydrogen to hydrocarbon mol ratio of from about 0.5 to about 15.0.

Broadly speaking, therefore, the present inventive method provides a method for obtaining an aliquot or representative sample of a flowing process stream at a temperature from 600° F. to 1000° F. and a pressure from 50 p.s.i.g. to 5000 p.s.i.g.

As with many other types of hydrocarbon conversion reactions, the catalytic reforming operation is generally carried out in a fixed bed reaction zone. Usually, a plurality of catalyst beds are used either in stacked fashion within a single reactor shell or, more preferably, in separate reactors. A single reactor with a single catalyst bed is frequently utilized, but in many cases a plurality of catalyst beds within a reaction zone are also used.

The inert gas which is utilized as an essential part of the inventive method may, of course, be any gaseous material which is inert to the system being sampled. For those conversion zones utilizing hydrogen as a reactant, either hydrogen gas or in some cases, steam, may be used as the inert gas. In still other situations, conventional inert gases, such as nitrogen, may be used with satisfactory results. The amount of inert gas which is utilized is not critical. It is only important that the amount of inert gas be at a pressure sufficient to pass through the inlet conduit into the flowing stream of the process fluid to be sampled, on a continuing basis except for that predetermined length of time when the flow of inert gas is stopped thereby permitting the flow of process fluid to be sampled into the inlet conduit so that it can be withdrawn and analyzed.

The predetermined length of time lapse varies considerably. Usually a timing device activating a solenoid valve will be all that is necessary for the operation of the inventive method. It should be noted that the control valve for the inert gas may be maintained under ambient conditions so that the prior art problems associated with high temperature resistant materials of construction, such as Teflon coated valves, have been substantially avoided.

The constant temperature environment may be created by any means known to those skilled in the art from a knowledge of the teachings presented herein and from general knowledge. A suitable liquid containing heat exchanger means may be utilized either as a bath or as a conventional tube and shell heat exchanger. It is only important in the practice of this invention that the constant temperature environment be capable of maintaining the temperature of the sample stream above the dew point of the effluent stream being sampled. Thus, the sample is maintained as a single phase.

Following the introduction of the sample stream into the inlet conduit, it is withdrawn and passed into detection means which may be a combination chromatographic column-ionization technique or other conventional detection devices for analyzing the expected components which are to be contained in the sample.

The invention may be more fully understood with reference to the appended drawing which is a schematic representation of the preferred embodiment of this invention.

DESCRIPTION OF THE DRAWING

Referring now to the drawing, a petroleum-derived naphtha fraction is introduced via line 10, admixed with recycle hydrogen from line 11 and introduced into catalytic reforming zone 13 via line 12. Reforming zone 13 contains a platinum catalyst and is operated under conventional reforming conditions in order to produce gasoline boiling range materials, such as a concentrate of single ring aromatic compounds, such as benzene. The operating pressure of catalytic reforming zone 13 is, for purposes of this illustration, about 175 p.s.i.g. The total effluent from the reforming zone is withdrawn via line 14, sampled via line 29 in a manner more fully developed hereinbelow, cooled by means of coolers not shown, and passed into separation zone 15 at a pressure of about 100 p.s.i.g.

The pressure of separation zone 15 is deemed to be substantially that maintained in reaction zone 13, although it is actually at a lower than reaction pressure due to the pressure drop through the system. Sufficient separation conditions including resistance time is imposed in zone 15 so that a relatively pure hydrogen stream is separated via line 11 and returned to the reforming zone in the manner previously mentioned. The material which is withdrawn via line 16 is a predominately liquid product stream containing the reformed hydrocarbons, to wit: gasoline boiling range hydrocarbons, such as benzene, toluene, and xylene, and also contains heavier boiling materials, such as tars and polymers and normally gaseous materials, such as the normally gaseous hydrocarbons and residual hydrogen.

The total material in line 16 is passed into fractionation column 17 which is maintained under conditions sufficient to produce an overhead fraction comprising normally gaseous components which are withdrawn via line 18 and distillate fraction comprising gasoline boiling range materials which are withdrawn via line 19 and a residuum or bottoms product stream which is withdrawn from the system via line 20.

At this point it might be well to note that the control of this reaction, according to prior art schemes, would be to sample the material in line 19 to determine, for example, its research octane number. If this determination indicated that the material in line 19 was defficient in octane number then by appropriate control means the reaction conditions in catalytic reforming zone 13 would be adjusted accordingly, such as, for example, increasing the temperature of the material in line 12 going into the reaction zone. However, by doing this, the prior art has sacrificed efficiency of control in that the entire system between reforming zone 13 and the withdrawal point of line 19 is filled with material which ostensively is not according to the predetermined value of octane number. It may take from 30 minutes to several hours for all of the undesirable material to work itself out of the system in response to the change made in the catalytic reforming zone. Returning now to the instant invention, the effluent stream flowing in line 14 is sampled in the following manner. In one embodiment, a drag stream of the recycle hydrogen from line 11, preferably, after regeneration by means not shown, and passed via line 21 through flow orifice 23 which is controlled by valve 24 through solenoid valve 25 being activated by timing device 26 into line 29 for passage through capillary means 28 and into the flowing stream of effluent in line 14. More preferably, however, a stream of hydrogen from line 22 is introduced into the system, in lieu of the material from line 21. Constant temperature bath 27 contains heat exchange medium to maintain the material in line 29 at a temperature level above the dew point of the effluent stream in line 14.

Timing device 26 has been set, for example, for continuous introduction of hydrogen except for a stopping period of small duration, typically, from 2 minutes to 10 minutes depending upon the time desired for taking a representative sample. Accordingly, hydrogen gas is introduced through line 29 and into line 14 on a continuous basis according to the progress of timing device 26.

At an appropriate time, device 26 closes valve 25 thereby stopping the flow of hydrogen gas. Since the pressure of the material in line 14 is at a high level, the material in line 14 will pass into line 29 in the reverse direction to the hydrogen flow through capillary 28 which is surrounded by bath 27, through capillary 30 which is also surrounded by bath 27, and through line 21 into chromatographic column 32 which is operated in conventional manner to cause resolution of the sample and the predetermined components. The step-wise evolution of components is withdrawn from column 32 and passed into detection means 34 from line 33. Detection means 34 may be of a conventional dielectric constant meter which utilizes hydrogen as a reference gas which is introduced into line 35 and withdrawn through line 36. The entire sample is withdrawn via line 37 and disposed of in conventional manner including the return of the material to the process at any point desired.

Additional hydrogen may be introduced into the sample medium from line 22. Alternatively, and, preferably, only hydrogen from an extraneous source may be utilized from line 22 with no material being taken from line 21. However, since catalytic reforming does have an easily accessible source of hydrogen, the process hydrogen may, in some cases, be used in the sampling medium according to the teachings of the present invention.

The results obtained from detection means 34 may be utilized to control an operating parameter in catalytic reforming zone 13. The benefit to be gained by using detection means 34 to control reforming zone 13 is that the elapsed time has been significantly decreased. The time spent between detection means 34 and reforming zone 13 is considerably less than that between reforming zone 13 of the conventional prior art sampling means of line 19.

It is to be understood, however, that the combination of chromatographic column 32 and detection means 34 is by no means critical to the practice of this invention. As those skilled in the art will recognize from the teachings present herein, any type of conventional analytical means may be utilized in combination with the sampling system of the present invention.

In summary, therefore, the present invention provides a system and method for sampling a high pressure, high temperature region, such as a conversion zone reactor, or intermediate reaction zones in the case of multiple reactor, which consists of "bucking" the high pressure reactor system with a carrier gas, such as hydrogen, so that no products will flow into the sample region and a small net flow of hydrogen will actually flow into the reactor system. When a sample is desired, the hydrogen flow is stopped, permitting the product to flow into the sample line. After a finite period of time, preferably, predetermined, the hydrogen flow and pressure is reanalyzed on the sample line thereby stopping the sample flow and flushing out the sample line. The sample that has passed the hydrogen introduction point is then introduced into a suitable analytical system, such as a chromatograph. Thus, the present invention provides an improved system for sampling which operates without moving parts, e.g. there is no valve means in the sample line, per se, and which obtains a sample as a single phase.

The invention claimed is:

1. Method for obtaining a representative sample of a high temperature, high pressure reaction zone effluent which comprises:
    (a) introducing an inert gas through an inlet conduit at a pressure sufficient to pass through said inlet conduit into the flowing effluent stream, said inlet conduit being placed under a constant temperature environment external to the reaction zone;
    (b) stopping said introduction of inert gas for a predetermined length of time thereby permitting a sample stream of said effluent to flow into said inlet conduit in a reverse direction to said flow of inert gas;
    (c) withdrawing said sample from said inlet conduit for the duration of step (b) utilizing, as the driving force for withdrawing said sample, the high pressure in said reaction zone;
    (d) passing said withdrawn sample into detection means; and
    (e) reintroducing said flow of inert gas when said time has elapsed thereby stopping the sample flow without valve means in said inlet conduit.

2. Method according to claim 1 wherein said reaction zone effluent comprises the effluent from a hydrocarbon conversion reaction zone at a temperature from 600° F. to 1100° F. and a pressure from 50 p.s.i.g. to 5000 p.s.i.g.

3. Method according to claim 2 wherein said inert gas comprises hydrogen.

4. Method according to claim 1 wherein said constant temperature environment maintains the sample stream at a temperature above the dew point of said effluent stream being sampled.

References Cited

UNITED STATES PATENTS

| | | | |
|---|---|---|---|
| 2,306,606 | 12/1942 | Hirsch | 73—422X |
| 3,408,869 | 11/1968 | Auger | 73—421.5 |

S. CLEMENT SWISHER, Primary Examiner